Patented May 6, 1924.

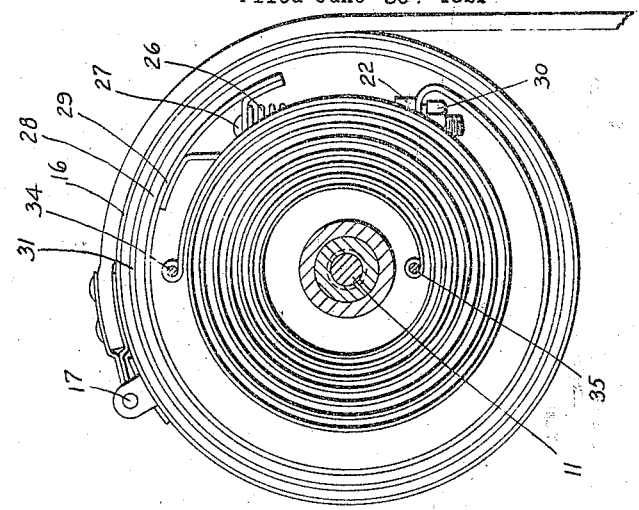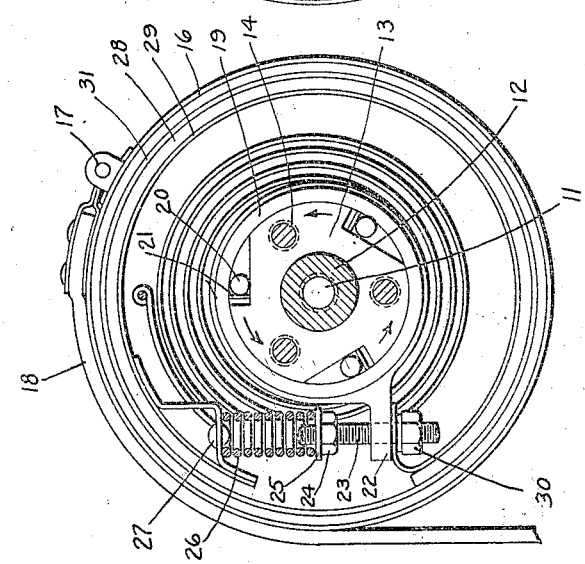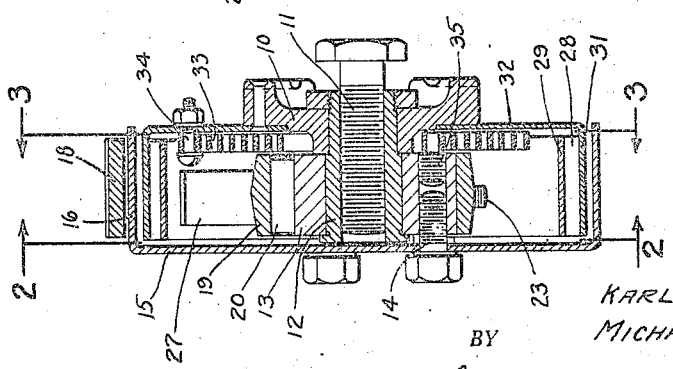

1,492,681

UNITED STATES PATENT OFFICE.

KARL FEILCKE AND MICHAEL I. KLINE, OF INDIANAPOLIS, INDIANA, ASSIGNORS TO THE AMCO COMPANY, OF INDIANAPOLIS, INDIANA, A CORPORATION.

SHOCK ABSORBER.

Application filed June 20, 1922. Serial No. 572,162.

*To all whom it may concern:*

Be it known that we, KARL FEILCKE, a citizen of the German Republic, and MICHAEL I. KLINE, a citizen of the United States, and both residents of Indianapolis, county of Marion, and State of Indiana, have invented certain new and useful Shock Absorbers; and we do hereby declare that the following is a full, clear, and exact description thereof, reference being had to the accompanying drawings in which like numerals refer to like parts.

This invention relates to a shock absorber for vehicles, and more particularly to that type of shock absorber commonly termed a snubber or one way check, so as to snub or check the rebound of a vehicle between the body and the chassis.

The principal object of this invention is to increase the braking surface of the snubber, whereby it will be more efficient and also to make it substantially dust proof so as to preserve the working parts and the frictional surface. Whereas heretofore snubbers have usually been constructed with an outside casing having a considerable opening in the periphery thereof through which a strap extends, connected at one end to the brake shoe. The space provided between the brake shoe and the casing in the old type has been appreciable in order that the adjusting means and the strap will have ample room to operate. In the construction herein described the casing is eliminated, thereby eliminating the opening in the periphery and the space intermediate of the shoe and the casing, through which dirt and dust may pass and accumulate. The elimination of the casing and the intermediate space also permits of a considerable increased area of braking surface, so that in the construction herein described the braking surface has substantially the same periphery as the old casing has instead of the periphery being greatly reduced in diameter and braking surface. In this connection reference may be had to application Serial No. 524,429, filed December 23, 1921, as showing the same usual type of construction with respect to the casing of the brake shoe. Whereas the old construction was provided with an internal brake drum and an external contracting brake shoe, this construction provides for an external brake drum and an internal expanding brake shoe so as to permit of the adjusting means of the brake shoe being internally positioned. Still another feature of the invention resides in the means for taking up wear upon the brake drum and the brake shoe, said means being so arranged as to eliminate the necessity of adjustment as heretofore. Its being mounted internally of the brake shoe rather than externally thereof, permits the elimination of the intermediate space between the brake shoe and the casing.

The full nature of this invention will be understood from the accompanying drawings and the following description and claims:

Fig. 1 is a central vertical section taken through the shock absorber. Fig. 2 is a section taken on the line 2—2 of Fig. 1. Fig. 3 is a section taken on the line 3—3 of Fig. 2.

In the drawings there is shown a shock absorber or snubber mounted upon a bracket 10 adapted to be rigidly secured to the body portion of a vehicle. Said bracket is provided with a cap screw 11 adapted to be screwed into the stationary spindle 12, so that said spindle is thereby rigidly secured in fixed position to the vehicle body. Rotatably mounted upon said spindle there is a clutch member 13 which is securely bolted by the bolts 14 to the cup-shaped strip drum 15 which is provided with an annular flange 16. Mounted on the flange 16 and rigidly secured thereto there are ears 17 between which there is pivotally secured the flexible strap 18, said strap being adapted to be rigidly secured at its other end to the axle of the vehicle. The above mentioned parts, the member 13, drum 15 and strap 18 are fixedly secured together as a single unit, and in fact the drum 13 and plate 15 may be cast integral rather than secured by the bolts 14. Also the strap 18 may be riveted to the annular flange 16 of the plate, rather than pivotally secured to the ears 17, if desirable.

Surrounding the member 13 there is a clutch ring 19 adapted to be engaged and clutched to the drum 13 by the clutch rollers 20 when the drum 13 is rotated about the spindle 12 in the direction indicated by the arrows in Fig. 2. For this purpose said member 13 is provided with a plurality of peripheral recesses, as shown in Fig. 2, in which are mounted the clutch rollers 20.

For normally maintaining the clutch rollers in engagement with the inner periphery of the clutch ring 19 there are provided a plurality of springs 21. Obviously when the drum is rotated in the opposite direction to the arrows the clutch ring will be released by the rollers and it will rotate with respect thereto.

The clutch band is provided with a projecting ear 22 through which is threaded the bolt 23, having screwed on the upper end thereof the nut 24 with a washer 25 on which is seated the compression spring 26 adapted to engage at its other end a projecting seat 27. Mounted concentrically with the member 13 and the clutch ring 19 there is an internal expanding brake shoe 28 supported and carried by the metallic band 29. The brake shoe is cut away at one portion so as to have its ends spaced apart as shown in Fig. 2, and the supporting band has one end thereof securely clamped between the projection 22 and the nut 30 which is screwed upon the lower end of the bolt. The band 29 passes about the inner periphery of the shoe and the opposite end is secured to the seat 27. By means of this arrangement the shoe is supported against the inner periphery of the brake drum so as to frictionally engage thereon under tension of the spring 26. The spring 26 constantly maintains the shoe in frictional engagement with the band without necessity of any adjustment thereof owing to wear upon the frictional surface. Surrounding the initial brake shoe there is a brake drum 31 formed substantially cup-shaped and having a peripheral flange forming the drum so as to telescope within the drum 15 and be positioned adjacent the inner periphery of the flange 16.

The spindle 12 is rigidly secured upon the bracket 10 and likewise the side plate 32 of the drum 31 is rigidly secured to said bracket by suitable rivets. Therefore, the stationary elements comprise the bracket 10, spindle 12 and drum 31, whereas the movable elements comprise the member 13, drum 15 and shoe 29 when clutched by said drum 13.

When the running gear and the chassis frame come together, the distance between them is shortened and, therefore, the movable parts must be rotated to take up slack in the strap 18. For this purpose there is a convolute spring 33 mounted adjacent the side plate 32 and being at its outer periphery secured to said side plate by the bolt 34. The inner end of said spring is secured to the member 13 by the stud 35. Said spring is so arranged as to normally tend to cause the member 13 and its associated parts to rotate with respect to the fixed parts in a direction opposite to that designated by the arrows so as to take up any slack in the strap caused by the movable parts of the vehicle coming together.

In operation when a vehicle receives a shock, the tendency would be for the body and the running gear to first come together. This movement is freely permitted because of the flexibility of the strap 18, and the slack caused thereby in said strap will be taken up by the spring 33 causing the rotation in the above mentioned direction of the member 13, which is connected with the drum 15 to which said strap is attached, said movement being permitted by the disengagement of the clutch rollers 20. Upon a rebound wherein the body and axles of the vehicle tend to separate, the strap 18 causes the drum 15 to turn in the direction indicated by the arrow in Fig. 2, and whereas the member 13 is secured to said drum, it will also be caused to rotate in the direction indicated by the arrows, which will immediately throw the clutch rollers into clutching engagement with the clutch ring 19 so that it will likewise be caused to rotate in the same direction. Said ring being secured to the brake shoe 28, it will be caused to rotate therewith, whereas the brake drum 31 remains stationary. Therefore, the frictional engagement between the brake members will tend to stop or retard this movement and consequently the upward movement or rebound of the body.

It will be noted that an internal expanding brake shoe is used in place of the usual type of external brake shoe. This permits the surface of the brake shoe and the drum to surround and enclose the operative parts and adjustments rather than to have any portion thereof positioned external of said members, whereby they may be of maximum diameter, and, therefore, have maximum braking surface, the brake drum being substantially of the same diameter and width as the casing heretofore employed.

The invention claimed is:

1. A shock absorber for checking the rebound between two relatively movable members including a cup-shaped stationary unit rigidly secured to one of said movable members, a cup-shaped rotary unit attached to the other movable member, said units telescoping one within the other, said stationary unit including an external brake drum and a centrally positioned spindle, said rotary unit comprising a clutch member rotatably mounted on said spindle, an internally expanding brake shoe in position to be engaged and disengaged by said clutch member, and means for maintaining said units in frictional engagement.

2. A shock absorber for checking the rebound between two relatively movable members comprising an external brake drum and an internally mounted brake shoe in position to engage the internal surface of said brake drum and in frictional engagement therewith, means for rigidly securing said brake drum to one of said movable members, a clutch mechanism, means attached to the other movable member for rotating said mechanism in one direction, and yielding means contained within said brake drum for rotating said mechanism in the opposite direction, said clutch mechanism being arranged to engage with said shoe and cause it to turn therewith when rotated by said first mentioned means and to release said shoe when rotated by said yielding means.

3. A shock absorber for checking the rebound between two relatively movable members comprising an external brake drum and an internally mounted brake shoe in frictional engagement therewith and so formed as to have adjacent free ends, means for rigidly securing said brake drum to one of said movable members, clutch means connected with the other movable member for causing the rotation of said internal shoe when rotated in one direction, and the release of said shoe when rotated in the other direction, and means mounted between the free ends of said brake shoe and yieldingly forcing them apart for normally maintaining said shoe in expanded position under spring tension.

4. A shock absorber for checking the rebound between two relatively movable members including a central stud adapted to be rigidly secured to one of said movable members, an external brake drum rigidly mounted on said stud, a clutch member rotatably supported by said stud, an internal brake shoe rotatably supported on said clutch member in position to frictionally engage the internal surface of said drum, said clutch member having means for permitting the free rotation of said shoe in one direction and preventing its rotation thereon in the opposite direction, and means connecting said clutch member with the other movable member.

5. A shock absorber for checking the rebound between two relatively movable members including a cup-shaped stationary unit rigidly secured to one of said movable members, a cup-shaped rotary unit attached to the other movable member, said units telescoping one within the other, and a winding spring connecting said units, said stationary unit including an external brake drum and a centrally positioned spindle, said rotary unit comprising a clutch member rotatably mounted on said spindle, an internally expanding brake shoe in position to be engaged and disengaged by said clutch member, internally mounted means positioned within said shoe for maintaining said shoe under spring pressure in frictional engagement with said drum, and a flexible strap secured at one end to said rotary unit and at the other end to said movable member, substantially as and for the purpose described.

In witness whereof, we have hereunto affixed our signatures.

KARL FEILCKE.
MICHAEL I. KLINE.